# 3,016,118
ELECTROMAGNETIC CLUTCHES AND BRAKES

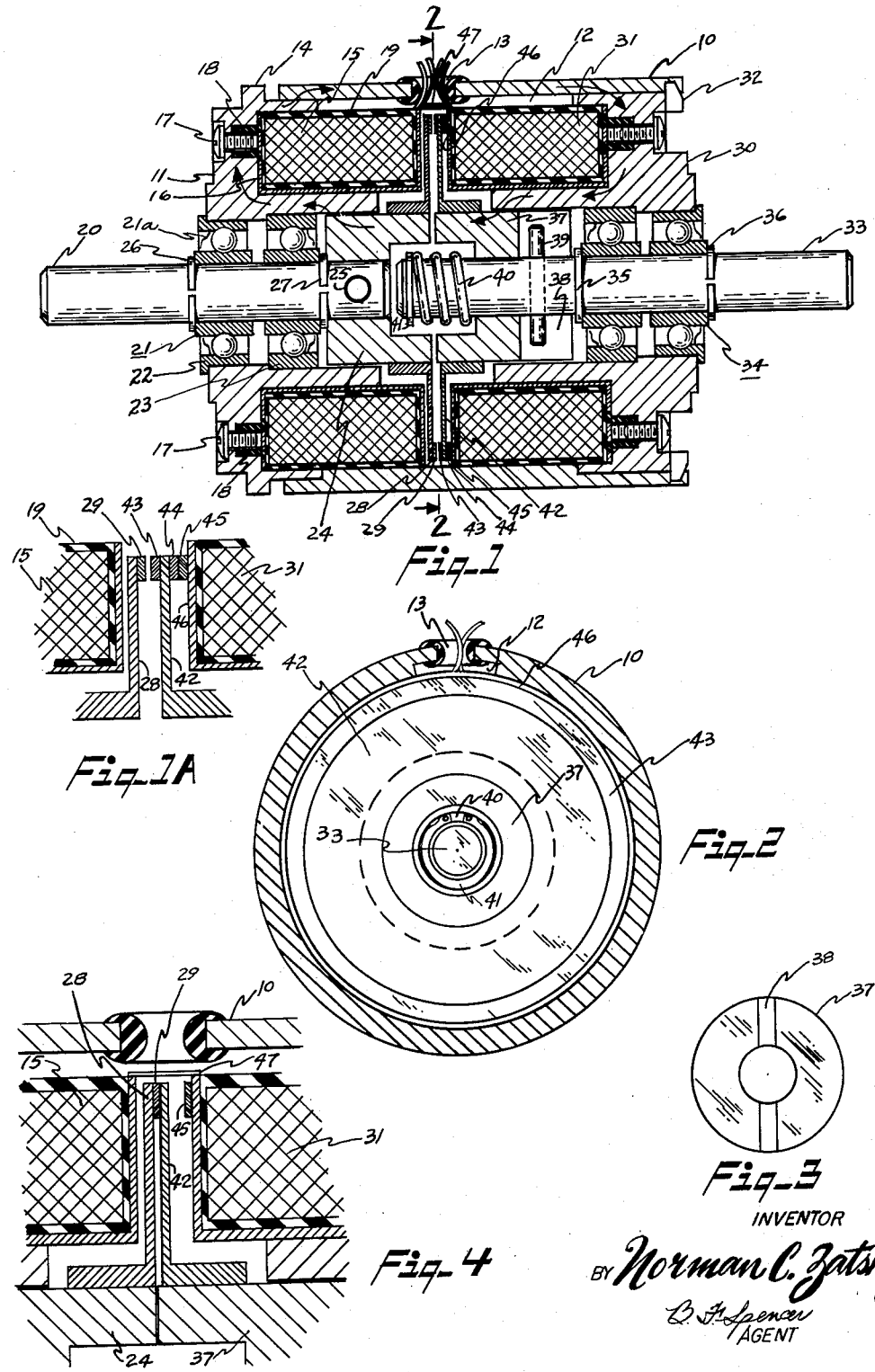
Fig_1
Fig_1A
Fig_2
Fig_3
Fig_4
INVENTOR
BY Norman C. Zatsky
AGENT

Norman C. Zatsky, Huntington, N.Y., assignor to Reeves Instrument Corporation, Garden City, N.Y., a corporation of New York
Filed Dec. 29, 1958, Ser. No. 783,552
15 Claims. (Cl. 192—18)

This invention relates to electromagnetic devices, and in particular to clutches and brakes of the electromagnetic type.

It is a principal object of the invention to provide an improved magnetically operated device of small size which may be used for the transmission of relatively high torques.

Another object is to provide an improved magnetic clutch, brake or clutch-brake which is capable of high torque transmission wherein the coupling surfaces of the torque transmitting member or members are located at a maximum distance from their centers of rotation.

Still another object is to provide a friction type magnetic clutch brake or clutch-brake which is capable of high torque transmission yet requires a minimum time for engagement.

A further object is to provide a magnetic device having an efficient, symmetrically disposed, magnetic structure with low leakage losses.

A still further object is to provide a magnetic clutch having a pair of symmetrically disposed coils which may be simultaneously energized to engage the clutch.

Yet another object is to provide an improved magnetic clutch which functions as a brake when the clutch is de-energized.

The foregoing objects are achieved in the present invention wherein a pair of non-magnetic clutch discs having outer diameters only slightly less than the inner diameter of the clutch housing are arranged to rotate between a pair of coaxial electromagnetic assemblies. Each of these assemblies consists of an annular magnetic core on which is wound a solenoid coil. The coils, which may be connected in series or in parallel are simultaneously energized from an external voltage source to engage the clutch discs. An armature of magnetic material is rotatably mounted within each of the annular cores, one of the clutch discs being rigidly attached to each of the armatures. The armatures, which are mounted on non-magnetic shafts, are attracted toward each other when the solenoid coils are energized thus drawing the adjacent surfaces of the clutch discs together.

Since the clutch discs rotate in the space between the magnetic cores, bands of material having a high coefficient of friction may be affixed to the faces of the discs near the outer periphery of the coils rather than within the coils thereby providing increased torque without increasing the overall diameter of the clutch. Flux leakage in the magnetic structure is also reduced to a minimum since the gap in which the clutch discs rotate is in a region across which the magnetic potential is essentially zero. This efficient magnetic structure is due principally to physically separate, and essentially identical, magnetic cores located symmetrically with respect to the clutch discs.

The above objects of and the brief introduction to the present invention will be more fully understood and further objects and advantages will become apparent from a study of the following detailed description in connection with the drawings, wherein, FIG. 1 is a longitudinal sectional view of the magnetic clutch in its disengaged position, and FIG. 1A is a detailed sectional view of the clutch discs, FIG. 2 is a cross-sectional view of the magnetic clutch of FIG. 1 taken along the line 2—2, FIG. 3 is an end view of the slotted armature of FIG. 1, and, FIG. 4 is a sectional view of a portion of a modified form of clutch disc.

Referring to FIGS. 1 and 2 of the drawing, a cylindrical housing 10 made of magnetic material such as low carbon steel is pressed on to a substantially annular magnetic core member 11 forming one end bell of the clutch. Housing 10 is provided with an internal, longitudinal, groove 12 having an aperture 13 at its center, and with an external flange 14 at one end to permit convenient mounting of the clutch. A solenoid coil 15 is wound within a non-magnetic form 16 which is affixed to core 11 by screws 17, screws 17 engaging threaded inserts 18 attached to the coil form. The coil form 16 may be made of a non-magnetic metal, such as aluminum or brass, insulated from coil 15 by a layer of electrical tape 19. Alternatively, the coil form may be manufactured from any suitable laminated, molded or machined phenolic compound, in which case the insulation 19 may be omitted. The leads of coils 15 and 31 are inserted in housing 10 through groove 12 when the clutch is assembled and then brought out through aperture 13 for external connections.

A non-magnetic stainless steel input shaft 20 is rotatably mounted in a bearing assembly 21 comprising radial bearings 22 and 23 and having shields 21a to prevent entry of foreign matter into the bearings. A cup-shaped armature 24 of magnetic material is rigidly fastened to the end of input shaft 20 by a pin 25, armature 24 being rotated by input shaft 20. Input shaft 20 and armature 24 are restrained from axial movement by snap rings 26 and 27 which are affixed to the shaft on either side of bearings assembly 21. Snap ring 26 also holds the flange of bearing 22 against the outer surface of annular core 11 while ring 27 positions bearing 23 against the shoulder in the bore of core 11.

A non-magnetic torque transmitting member consisting of a stainless steel disc 28 is secured by a press fit to armature 24. As shown in detail in FIG. 1A, one side of disc 28 is provided with a band of highly frictional material 29 projecting from the face of the disc along its outer edge. Band 29 may be comprised of cork, a sintered mixture of metallic and non-metallic powders, or any other suitable material having a high coefficient of friction when in contact with an appropriate mating surface.

A stationary electromagnetic assembly, similar to that consisting of annular core 11 and solenoid coil 15, is symmetrically disposed at the other end of housing 10. This assembly consists of a substantially annular core 30 having a coil 31 affixed thereto in the same manner that coil 15 is attached to core 11. A retaining ring 32, which fits into a groove in the inner surface of housing 10, positions core 30 within the housing.

A non-magnetic stainless steel output shaft 33 is rotatably supported in a bearing assembly 34 positioned at the outer end of annular core 30 by snap rings 35 and 36. Output shaft 33, which is restrained from axial movement by snap rings 35 and 36, has a rotatable and axially translatable cup-shaped armature 37 mounted adjacent its inner end. As shown in FIGS. 1 and 3, cup-shaped armature 37 has a diametrical slot 38 cut in its closed end to receive a pin 39 affixed to shaft 33. A helical spring 40, held in place by snap ring 41, forces armature 37 axially toward the right (FIG. 1) thereby tending to keep the adjacent faces of armatures 24 and 37 separated.

A second non-magnetic clutch disc 42 is attached by means of a press fit to armature 37. The face of disc 42 adjacent disc 28 is provided with a frictional band 43 along its outer edge which mates with band 29, while a similar band 44 is bonded to the outer edge of the other face of disc 42. A braking surface 45 composed of a material having a high coefficient of friction when in contact with band 44 is bonded to the metallic coil form 46. When coils 15 and 31 are de-energized, band 44 is held against braking surface 45 by the action of spring 40 thereby resisting any torque within the rating of the clutch which may be applied externally to output shaft 33.

When the clutch is de-energized, the distance between friction bands 29 and 43 is slightly less than the distance between adjacent faces of armatures 24 and 37. Thus, when solenoid coils 15 and 31 are energized, armature 37 is attracted toward armature 24, friction bands 43 and 29 are brought into contact with each other under pressure, and shafts 20 and 33 are thereby positively engaged as long as the rated load limit of the clutch is not exceeded.

FIG. 4 depicts a portion of an alternative clutch disc configuration in its engaged position. This configuration may be used to reduce the moment of inertia of the output disc 42 and, under some conditions, improve the torque transmitting characteristics of the clutch. In this form of the invention, the friction bands are omitted from clutch disc 42 thereby reducing its moment of inertia and providing a coupling surface directly between stainless steel disc 42 and band 29.

Since the friction bands on the faces of clutch discs 28 and 42 are located at a maximum distance from the center line of the shafts, the torque which can be transmitted by the subject clutch is high when compared with conventional clutches of this type. The use of clutch discs with friction surfaces minimizes the time required for engagement of the discs and, in addition, permits continuous engagement since there are no gear teeth to mesh. Still higher torques may be transmitted by replacing the friction bands with crown tooth couplings but this will result in some increase in the time required for engagement of the clutch discs.

The lines of flux set up when coils 15 and 31 are energized will follow the path shown by the arrows in FIG. 1 extending through annular core 11, housing 19, annular core 30, armature 37 and armature 24. The magnetic path is symmetrical with respect to the center of the clutch and, therefore, the magnetic potential across the clutch disc air gap will be substantially zero. Because of this substantially zero magnetic potential and because the clutch discs are made of non-magnetic material, there is essentially no path for leakage flux and, therefore, the magnetic structure is extremely efficient. In order to keep the area of the path which the flux traverses constant over its entire length, the thickness of the armature, which is located closest to the shaft, is made greater than that of the cylindrical housing comprising the outer circumference of the clutch. Also, armature 37 is longer axially than armature 24 in order to compensate for the magnetic material removed to form slot 38. Since the clutch discs do not form a part of the magnetic path, they do not carry any flux and, therefore, may have a reduced cross-sectional area which is determined principally by mechanical considerations.

Coils 15 and 31 may be connected either in series with a D.-C. voltage source or, if a lower input impedance is desired, they may be connected in parallel with the source. The polarity of the connections to the two coils should be such that each coil produces flux in the magnetic circuit which is in the same direction and, therefore, aiding rather than opposing. An annular cover 47 is provided to keep the coil leads and discs 28 and 42 separated.

As many changes could be made in the above construction and many different embodiments could be made without departing from the scope thereof, it is intended that all matter contained in the above description or shown in the accompanying drawing shall be interpreted as illustrative and not in a limiting sense.

What is claimed is:

1. An electromagnetic clutch comprising a magnetic housing, first and second substantially annular magnetic cores coaxially disposed within said housing, the adjacent ends of said cores being axially displaced from each other, first and second coils surrounding said first and second annular cores respectively, said coils having a pair of adjacent ends between which there is a non-magnetic region for minimizing radial components of magnetic flux at said adjacent ends upon energizing said coils, first and second shafts rotatably mounted within said first and second annular cores, first and second magnetic armatures mounted on said first and second shafts respectively for rotation therewith, said armatures being adapted for axial translation with respect to each other, first and second torque transmitting members affixed to said first and second armatures respectively, said torque transmitting members being disposed in the space between said coils, and means situated within said housing for maintaining said first and second armatures and torque transmitting members separated from each other when said coils are de-energized.

2. An electromagnetic clutch as defined in claim 1 wherein said torque transmitting members comprise non-magnetic discs adapted for rotation within said housing, the periphery of said discs being closely adjacent the inner surface of said housing.

3. An electromagnetic clutch as defined in claim 2 wherein at least one of said non-magnetic discs has a band of frictional material affixed to its surface adjacent to its outer edge.

4. An electromagnetic device comprising a cylindrical housing, first and second substantially annular magnetic cores coaxially disposed within said housing, the adjacent ends of said cores being axially displaced from each other, first and second coils surrounding said first and second annular cores respectively, first and second shafts rotatably mounted within said first and second annular cores, a first armature rigidly coupled to said first shaft, a second armature slideably mounted on said second shaft and adapted for rotation therewith, spring means surrounding said second shaft and pressing against said second armature, said spring means urging said second armature away from said first armature, and first and second torque transmitting discs affixed to said first and second armatures respectively for rotation in the space between said first and second coils, said second torque transmitting disc being translated axially by said second armature to engage said first torque transmitting disc when said coils are energized.

5. An electromagnetic device as defined in claim 4 wherein said first and second torque transmitting discs are provided with frictional bands affixed to the adjacent surfaces near their outer edges.

6. An electromagnetic device as defined in claim 4, further comprising an annular stationary braking surface situated within said housing and wherein said second torque transmitting disc is pressed against said braking surface by the action of said spring means when said coils are de-energized.

7. An electromagnetic device as defined in claim 4 wherein said first torque transmitting disc is provided with a frictional band affixed near its outer edge on the surface adjacent said second torque transmitting disc.

8. An electromagnetic clutch comprising a cylindrical housing of magnetic material, first and second end pieces of magnetic material affixed to the ends of said cylindrical housing, each of said end pieces having a central bearing opening located therein, first and second axially spaced annular cores of magnetic material attached to the inside surfaces of said first and second end pieces respectively, first and second spaced annular windings surrounding said first and second annular cores respectively, first and second shafts rotatably supported within said bearing openings, a first cup-shaped armature of magnetic material rigidly attached to said first shaft, a second cup-shaped armature of magnetic material slideably mounted on said second shaft and adapted for rotation therewith, the open ends of said first and second cup-shaped armatures extending beyond the unattached ends of said first and second annular cores respectively, first and second coaxial non-magnetic torque transmitting discs affixed to said first and second armatures respectively, said torque transmitting discs being disposed in the space between said spaced annular cores and windings, and spring means surrounding said second shaft forcing said second armature axially away from said first armature, said annular windings being effective upon energization to translate said second armature toward said first armature thereby bringing said second disc into engagement with said first disc.

9. An electromagnetic clutch comprising a magnetic housing, first and second substantially annular magnetic cores coaxially disposed within said housing, the opposite ends of said cores being attached to said housing and the adjacent ends of said cores being axially displaced from each other, first and second coils surrounding said first and second annular cores respectively, said coils having a pair of adjacent ends between which there is a non-magnetic region for minimizing the radial components of magnetic flux at said adjacent ends upon energizing said coils, first and second cylindrical armatures having outer diameters smaller than the inner diameters of said annular cores, means for supporting said armatures within said first and second annular cores respectively for relative rotation with respect to said cores, one of said armatures being adapted for axial translation with respect to the other, first and second torque transmitting members affixed to said first and second armatures respectively, said torque transmitting members being disposed in the non-magnetic region between said first and second coils, and means situated within said housing for maintaining said first and second armatures and torque transmitting members separated from each other when said coils are de-energized.

10. An electromagnetic clutch comprising a magnetic housing, first and second substantially annular cores coaxially disposed within said housing, the opposite ends of said cores being attached to said housing and the adjacent ends of said cores being axially displaced from each other, first and second coils surrounding said first and second annular cores respectively, said coils having a pair of adjacent ends between which there is a non-magnetic region for minimizing radial components of magnetic flux at said adjacent ends upon energizing said coils, first and second cylindrical armatures having outer diameters less than the inner diameters of said cores, means for supporting said armatures within said first and second cores respectively for relative rotation with respect to said cores, one of said armatures being adapted for axial translation with respect to the other, clutch discs affixed to said first and second armatures respectively, said clutch discs being disposed in the non-magnetic region between said first and second coils, frictional bands affixed to the surfaces of said clutch discs near their outer edges, and resilient means situated within said housing for maintaining said first and second armatures and clutch discs separated from each other when said coils are de-energized.

11. Apparatus for mechanically coupling first and second substantially coaxial mechanical members, said members being rotatable with respect to each other, comprising first and second axially spaced electromagnetic assemblies surrounding said first and second mechanical members respectively, each of said electro-magnetic assemblies including a magnetic core and a coil wound therein, said coils having a pair of adjacent ends between which there is a non-magnetic region for minimizing radial components of magnetic flux at said adjacent ends upon energizing said coils, first and second cylindrical armatures having outer diameters less than the inner diameters of said magnetic cores coupled to said first and second mechanical members respectively, means for supporting said armatures within said cores respectively, one of said armatures being adapted for axial translation with respect to the other, first and second torque transmitting members affixed to said first and second armatures respectively, said torque transmitting members being disposed in the non-magnetic region between said first and second electromagnetic assemblies, spring means surrounding said second mechanical member for forcing said second armature axially away from said first armature, and magnetic means surrounding the coils of said first and second electromagnetic assemblies, said magnetic means magnetically coupling the cores of said first and second electromagnetic assemblies.

12. An electromagnetic device comprising a magnetic housing, a pair of annular coils, means for supporting said coils in coaxial relationship within said housing, said coils having a pair of adjacent ends between which there is a non-magnetic region for minimizing radial components of magnetic flux at said adjacent ends upon energizing said coils, a pair of cylindrical magnetic armatures having outer diameters less than the inner diameters of said coils, means for supporting said armatures within said coils respectively, said armatures having a pair of adjacent poles between which an axial magnetic force is provided upon energizing said coils, means for supporting one of said armatures for movement relative to the other of said armatures from a first position to a second position along the axis of said coils in response to said axial magnetic force, means for returning said one armature to said first position in the absence of said magnetic force, and a non-magnetic torque transmitting member affixed to said one armature, said torque transmitting member being disposed in the non-magnetic region between said first and second annular coils.

13. The electromagnetic device as defined by claim 12, further including another non-magnetic torque transmitting member between the adjacent ends of said coils for engaging said one torque transmitting member at the moment said one armature is in one of said first and second positions, and means for attaching said other torque transmitting member to the other of said armatures.

14. The electromagnetic device as defined by claim 13, further including means located in the vicinity of the outer circumferences of said coils for braking one of said torque transmitting members at the moment said one armature is at the other of said first and second positions.

15. The electromagnetic device as defined by claim 14, further including a pair of coaxial shafts extending into said pair of coils, respectively, means for mounting said shafts for rotation relative to said coils, said mounting means maintaining said shafts in fixed positions axially of said coils, means for attaching each of said armatures to a respective one of said shafts for rotation therewith, means for mounting said one armature for axial movement along the shaft to which it is attached, and spring means supported upon said last-named shaft for maintaining said one armature in one of said first and second positions opposite the position of said one armature upon energizing said coils.

References Cited in the file of this patent

UNITED STATES PATENTS

| 2,647,601 | Malick | Aug. 4, 1953 |
| 2,801,720 | Bachman | Aug. 6, 1957 |
| 2,941,640 | Weidmann | June 21, 1960 |

FOREIGN PATENTS

| 204,512 | Great Britain | Oct. 4, 1923 |